Dec. 26, 1933.   W. C. CORYELL   1,940,939
METAL WORKING
Filed June 4, 1928
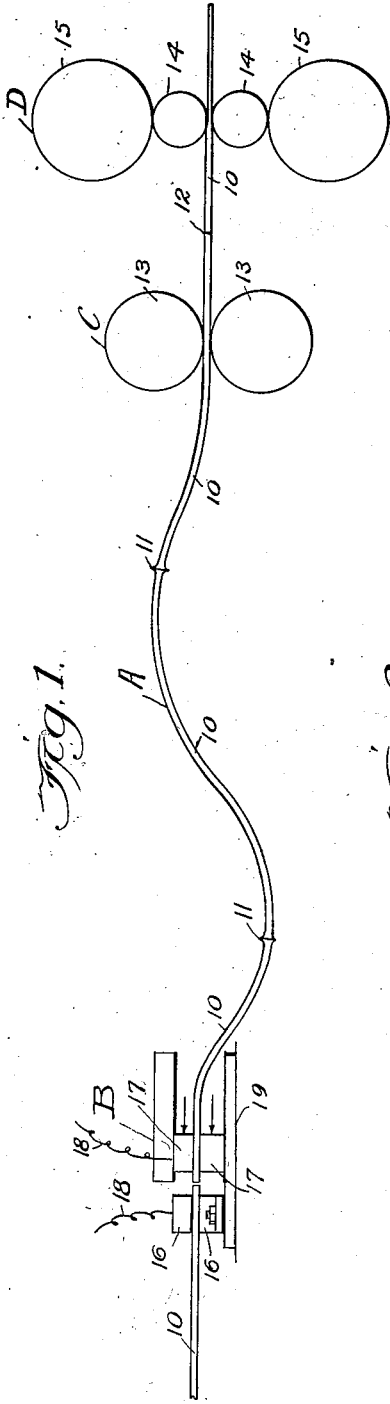
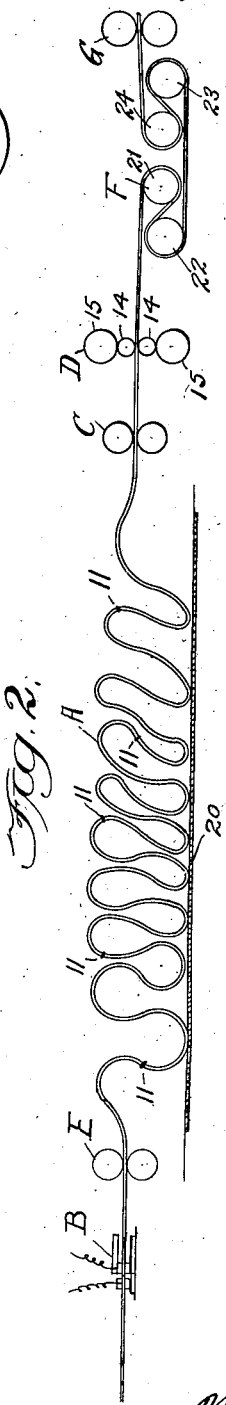
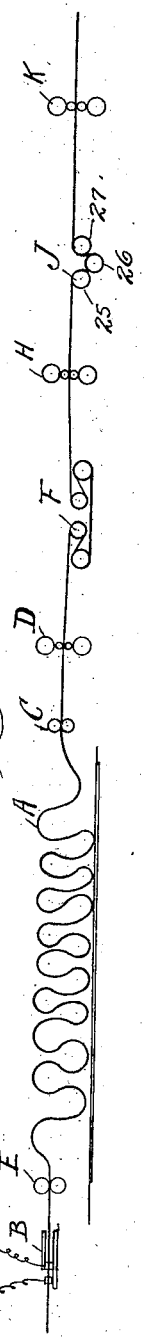
Inventor:
William C. Coryell
by Thomas H. Ferguson
Atty

UNITED STATES PATENT OFFICE 1,940,939

METAL WORKING

William C. Coryell, Youngstown, Ohio, assignor, by mesne assignments, to United Engineering and Foundry Company, Pittsburgh, Pa., a corporation of Pennsylvania Application June 4, 1928. Serial No. 282,653

8 Claims. (Cl. 80—60)

The present invention relates to the art of metal working and has to do more particularly with the production of long cold rolled metal strip.

The main objects of the invention are to greatly increase the output of the plant manufacturing such a product, to substantially eliminate the production of material that is defective for any reason such for example as marks on the surface thereof or lack of uniformity of gauge, and to effect economies of time, labor and equipment.

These objects are accomplished by continuously rolling a piece of metal which is being added to or built up as the rolling continues. In this way a continuous flow of metal is constantly passing to and through the mill. The constituent pieces which go to make up the continuous piece are added by welding. Thus, a first piece is started through a pass of the mill, then while it is being reduced and elongated by the action of the mill the forward end of a second constituent piece is welded to the rear end of the first piece, then the forward end of a third piece is welded to the rear end of the continuous composite piece thus built up, then a fourth piece is added, and so on, as long as desired. Indeed, there is no reason why the operation of thus welding and rolling simultaneously should not be carried on hour after hour, or even day after day, without once stopping the mill. The welding operations are frequent and quick enough relative to the lengths of the constituent pieces, to supply the composite continuous piece at a linear rate of speed at least equal to, and preferably greater than, that of the piece entering the mill.

The simultaneous rolling and welding may be carried on quite independently of the condition of the metal at the weld points but preferably I remove the roughness of the metal at such points before the composite piece passes into the first pass of the rolling mill plant. This may be done by any suitable means. In the embodiment herein disclosed I employ rolls for this purpose. These rolls in removing the excess of metal at the weld points receive the rough treatment which such irregular projections of metal produce and are made for that purpose and can be replaced readily and more often than the rolls of the four high pressure mill. In this way these weld treating rolls prepare the built up piece for entrance into the reducing mill and thus prolong the life of the rolls of the latter.

The advantages of my invention are numerous and important. There is the advantage of continuous running, instead of intermittent running, thereby producing higher volumetric speed through the mill passes, and consequently greater output per unit of time. There are fewer shutdowns and delays because there are no ends to thread through the passes while rolling. There are also fewer scrap losses because there are no ends that have to be cut off. There is better operation because, with no ends, there are no losses due to the ends catching onto objects encountered in the path of travel of the piece.

By continuous rolling, in the way contemplated by my invention, it is possible to keep the roll surfaces in better condition than where the rolling is intermittent. This results in producing a better surface on the rolled product. These results are secured because of the substantial absence of "tail marks" on the rolls of the mill.

As is well known, "tail marks" are caused by the trailing ends of pieces of metal that have been rolled to such thinness that they can not be further elongated by the rolling pressure. Under such circumstances, the surfaces of the rolls are permanently deformed. The rate of formation of tail marks in the manner referred to above varies with the number of trailing ends of thin metal passing through the mill.

By welding successive strips and rolling them continuously, I am enabled to eliminate "tail marks" to the same extent that trailing ends are eliminated. This change in operating conditions has an important effect on the quality of the material being rolled as such marks on the rolls are transferred to the surface of the material and if the marks are such as to mar the surface of the material the latter may be defective or unsuitable for many of its usual applications. Such material may either be scrapped or used for less profitable products.

Uniform gauge is also promoted by keeping a uniform compression upon the rolls at all times. This is possible where the metal piece being rolled is continuous, as is the case where the method of my invention is followed. The life of the mill is increased by reason of the steady and uniform work required of it. The cost of the product is less because production is increased and because there is less upkeep expense, less scrap, and less labor. Likewise, finished pieces of great length can be produced, and such are often desirable where the product is to be made and used in connection with manufacturing articles by automatic machinery. The preparing of the piece by the weld treating rolls also prolongs the life of the rolls of the reducing mill and brings rough treatment of the rolls at a preliminary point where they can be easily and economically replaced.

It should also be noted that my invention may be carried out, not only with mills of the usual compression type but also with mills employing extraordinary compressive and tensile forces such as are contemplated in the practice of the method of my Patent No. 1,618,515, granted February 22, 1927.

For a more complete understanding of the invention, reference should be had to the following description taken in connection with the accompanying drawing, and for a statement of the scope of the invention, attention is directed to the appended claims.

In said drawing, Fig. 1 is a diagrammatic view illustrating a welding and rolling plant constructed and arranged to carry out the present invention; Fig. 2 is a similar diagram illustrating a plant arranged to provide for an accumulation of welded strip and employing a mill associated with a pulling machine; and Fig. 3 is a similar diagram illustrating a continuous mill arrangement with pulling machines at different points in the progress of the strip through the plant. Throughout these views like characters refer to like parts.

In Fig. 1 the composite continuous strip A is shown made up of constituent sections or pieces 10 which are united together by welds at the points 11 and 12. A new piece 10 is about to be welded to the adjacent end of the composite strip by the welder B. The composite strip is shown passing between the rolls 13, 13 of a pinch roll mechanism C, and farther along between the reducing rolls 14, 14 of a rolling mill D. The reducing rolls are of relatively small diameter and are backed by compression rolls 15, 15 of relatively large diameter.

According to the invention, the composite strip A is rolled by the mill D and while such rolling continues the strip is added to by welding on new constituent pieces 10. Obviously, the welding operations must occur rapidly enough to provide composite strip fast enough to meet the requirements of the speed of the mill D. The welding may be performed in any desired way. In some instances, it might be advantageous to employ the acetylene torch, or the oxy-hydrogen torch. Usually, however, I prefer an electric butt-welder. Such is the welder illustrated. The ends of the pieces 10 which are to be welded are held on the one hand between the jaws 16, and on the other hand between the jaws 17. Of each pair of jaws one jaw is adjustable with respect to the other.

The electric connections 18 are such as to allow current to pass from one pair of jaws to the other pair through the two ends to be welded. At the same time the jaws are moved toward each other as indicated by the arrows and pressure is applied to the heated ends of the sections 10 and they are thus firmly welded together. In the present illustration the jaws 17 move along the support 19 but the jaws 16 do not. The current heats the ends to be welded and the sliding arrangement permits the ends to be brought together with sufficient pressure while so heated. The arrangement is a common one and any form of standard welder may be used for this purpose.

Usually, the welding operation leaves a rib or excess of metal at the point of welding. This rib or excess is sometimes called a flashing. For the best effect, this flashing should be dressed off or reduced in some other suitable way. In the embodiment shown the rolls 13 of the pinch roll mechanism C flatten down the flashing. Such a flattened weld is indicated at the point 12. Although this flattening of the weld is not necessary to the carrying out of my invention, yet it is desirable to flatten the welds before they come to the reducing rolls 14 of the mill D. This preliminary flattening preserves the highly finished surfaces of the rolls.

The mill D is of the ordinary compression type wherein the reducing rolls 14 are backed by heavy backing rolls 15. With the mill arrangement of Fig. 1, that is, without a pulling machine, the usual moderate reductions are obtained in the composite strip A passing through the mill. In this arrangement, the rolls of the mill D are positively driven. This may be done in any desired way. The rolls 13 of the mechanism C may be positively driven or not as desired. When not driven, they will be rotated by the pull of the continuous strip A as it passes between them in response to the pull of the rolls of the mill D.

The arrangement of Fig. 2 is quite similar to that of Fig. 1 and includes the welder B, the pinch roll mechanism C, and the rolling mill D. But, in addition there are the positively driven rolls of a pinch roll mechanism E located just following the welder B in a position where they will serve to advance the strip A from the welder B onto the support 20, where a considerable portion of the strip is allowed to accumulate in the form of coils or convolutions, before passing through the pinch rolls of the mechanism C and the reducing rolls of the mill D. The mill D in this instance is also adjusted so as to cooperate with a pulling machine F and advancing rolls G.

The pulling machine F includes four drums 21, 22, 23, 24. The strip A after leaving mill D passes over these drums in the order mentioned and in the way illustrated. The rolls G are driven so as to exert a slight pull upon the adjacent portion of the composite strip A. Each of the drums of the pulling machine F is positively driven and each acts as a sort of capstan to draw upon the strip A. It will be seen that a small pull on the part of the rolls G will be augmented by that of the drums of the pulling machine so as to exert a greatly increased pull upon the strip as it leaves the mill D. By giving the mill D extraordinary compression and regulating the rolls G to give, through the pulling machine F, a proper extra tension, it is possible to provide a resultant force in the material of the strip at the point where it is passing between the reduction rolls 14, which will lie in the neighborhood of the elastic limit of the material, and thus produce great reductions contemplated by the method of my prior Patent No. 1,618,515 previously mentioned. It is believed that the mechanism of the pulling machine F need not be more fully described in this connection. For further description and illustration, reference should be had to my application Serial No. 280,681, filed May 26, 1928.

In Fig. 3 the arrangement is such as to carry the strip A beyond the pulling machine F through a second rolling mill H, a second pulling machine J, and a third rolling mill K. The welder B, the advancing rolls E, the rolls of the pinch mechanism C, the rolling mill D, and the pulling machine F are all as previously described. The mill H is like the mill D and it is also intended to be used in the arrangement of Fig. 3, with the application of high tension. In the case of mill D the pulling machine F provides the tension, and in the case of mill H the pulling machine J provides the tension. The mill K is not associated with a pulling machine, as are the mills D and H, but gives the final reduction to the strip A without the application of tension to the portion of the same in advance of that particular mill.

The pulling machine J is similar to the pulling machine F but has only three drums 25, 26, 27. These are separately driven and, like the drums of the machine F, serve to multiply the pull upon the strip exerted by the mill K, thereby providing the necessary tension to the strip at the point where it passes between the reducing rolls of the mill H. The three drums on the pulling machine J necessarily increase the applied force to a less extent than the four drums on the pulling machine F. As before, it seems needless to here describe the details of the pulling machine J. If further description and illustration of the same is desired, reference may be had to my aforesaid application Serial No. 280,681, filed May 26, 1928.

It should be understood that in carrying out my invention a sufficient length of composite piece to extend from the welder through the various pinch rolls, mills and pulling machines, must be provided. Then this piece must be threaded through the various mechanisms. When the piece is thus in position, the various mechanisms may be set in operation. As the piece advances, the new constituent pieces are added one by one at the welder and in this way a continuous supply of material flows on to the mill plant and is there reduced step by step to the dimension desired in the finished product. In some instances the constituent pieces may be very short. If such be the case and there is not sufficient time to weld them one by one at the welder B, then an auxiliary welding plant may be employed where the short pieces are welded together into pieces of a satisfactory length, that is to say, a length such that when welded one by one to the advancing composite piece, they will furnish material for the mill plant as fast as the same requires it.

The butt-welder provides a weld which will stand the high tension intended to be applied to the composite piece by the pulling machines. Consequently butt-welding is much preferred where the high strain method of my prior Patent, No. 1,618,515, is employed; although it is not intended by this to say that other forms of welding may not do as well in some instances. Obviously where the pulling machines are not used, welds of less strength may be employed.

Although the rolls of the pinch roll mechanism C serve to grasp the strip and advance it they also serve to remove the excess of metal at the welds and thus remove the roughness and unevenness occasioned by the welding operation. They might be termed weld treating rolls. Obviously other weld treating means might be used instead of rolls. Many equivalent devices for removing the roughnesses of the welds will suggest themselves by persons skilled in this art and need not be enumerated.

The pinch roll mechanism E is the same in construction as the mechanism C and may have its rolls set to perform the same work. As illustrated in Fig. 2, the mechanism E is not set down as tight as the mechanism C and hence does not flatten out the weld points 11 to the same extent. Consequently these weld points 11 appear rather prominently in Fig. 2 but it must be understood that the rolls of mechanism E have partially flattened these points and that they are finished by the rolls of the mechanism C. Obviously the rolls of both mechanisms C and E may be variously set according to the extent of flattening each is to produce.

The employment of the methods of my invention not only prolongs the life of the rolls of the mill by eliminating the marking thereof by the ends of metal strip, but saves time and labor by reducing the number of changes of rolls required. The amount of material that must be scrapped or reduced in grade by reason of surface defects caused by roll marks thereon is very small. By reason of the uniform operating conditions with respect to speed of the mill and stresses on the material, the product of the mill is of uniform quality and gauge. Continuous operation materially increases the output of the mill and correspondingly lowers the cost of production.

From what has been said, it will be seen that many types of mills, pulling machines, welders and other like mechanisms may be used in carrying out my invention. Likewise many different kinds of strip may be welded and rolled. I therefore do not wish to be limited to the specific arrangements illustrated and described, but aim to cover all reasonable and legal adaptations of my invention by the terms of the appended claims.

What I claim as new and desire to secure by a patent of the United States is:

1. The method of continuously supplying and cold rolling elongated composite metal strip, which method consists in successively welding constituent pieces together end to end at a welding position to build up the composite strip as the metal passes through said position, and while such welding operations continue, continuously cold rolling the built up strip at a rolling position in series with said welding position by subjecting the same to resultant forces near the elastic limit of the metal of the strip, said resultant forces each having as components a compressive force exerted by the rolls of the mill and a tensile force applied in the line of travel of the strip through the mill.

2. The method of continuously supplying and cold rolling elongated composite metal strip, which method consists in successively welding constituent pieces together end to end at a welding position to build up the composite strip as the metal passes through said position, treating the metal of the composite strip at the weld points to remove roughness, and while such welding and treating operations are being performed, continuously cold rolling the built up strip at a rolling position in series with said welding position by subjecting the same to resultant forces near the elastic limit of the metal of the strip, said resultant forces each having as components a compressive force exerted by the rolls of the mill and a tensile force applied in the line of travel of the strip through the mill.

3. The method of continuously supplying and cold rolling elongated composite metal strip, which method consists in passing the metal in one general direction to and through welding and rolling positions arranged in series, by starting a cold constituent piece through a continuous rolling mill at said rolling position, continuously operating said mill, and supplying material for the continuous operation of said mill by continually welding at the welding position new constituent pieces of cold strip one by one to the new ends of the built up composite strip as they successively present themselves at the welding position.

4. The method of continuously supplying and cold rolling elongated composite metal strip, which method consists in passing the metal in one general direction to and through welding and rolling positions arranged in series, by starting a cold constituent piece through a continuous rolling mill at said rolling position, continuously operating said mill, supplying material for the continuous operation of said mill by continually welding at the welding position new constituent pieces of cold strip one by one to the new ends of the built up composite strip as they successively present themselves at the welding position, and treating the metal at the weld points to remove roughness, said treating occurring between said welding and rolling positions.

5. The method of supplying and cold rolling metal strip in a continuous mill, which method, being with a view to producing marketable strip by large reductions between annealings, free of roll marks, consists in maintaining a continuous supply of cold strip by successively welding constituent pieces together end to end at a welding position to build up the supply strip as the metal passes through said position on its way to the mill where it is fed at a given rate, advancing the cold composite strip thus formed and fed, continuously through passes of the mill stands in tandem, and reducing the cold composite strip thus advancing, by rolling with high compression at each of said passes, whereby the product strip issuing from the mill, due to the continuity of travel and the uniformity of the conditions encountered by the rolls, even though the reductions are large, is free from roll marks.

6. The method of supplying and cold rolling metal strip in a continuous mill, which method, being with a view to producing marketable strip by large reductions between annealings, free of roll marks, consists in maintaining a continuous supply of cold strip by successively welding constituent pieces together end to end at a welding position to build up the supply strip as the metal passes through said position on its way to the mill where it is fed at a given rate, advancing the cold composite strip thus formed and fed, continuously through passes of the mill stands in tandem, and reducing the cold composite strip thus advancing, by rolling with high compression and high tension at each of said passes, the resultants of said compression and tension approximating the yield point of the metal of the strip, whereby the product strip, issuing from the mill, due to its uninterrupted travel and the uniformity of the conditions encountered by the rolls, even though the reductions are large, is free from roll marks.

7. The method of supplying and cold rolling metal strip in a continuous mill having pulling machines intervening between its roll stands, which method, being with a view to producing marketable strip by large reductions between annealings, free of roll marks, consists in maintaining a continuous supply of cold strip by successively welding constituent pieces together end to end at a welding position to build up the supply strip as the metal passes through said position on its way to the mill where it is fed at a given rate, advancing the resulting continuous cold strip thus formed, through the mill stand passes and the cooperating pulling machines at a steady rate without stopping, and reducing the strip at the mill passes by applying tension by said pulling machines and compression by the mill rolls, such tension and compression being great enough to produce resultant forces approximating the yield point of the strip, to reduce the same at the passes in succession and extrude the same from the mill in a steady flow, as a product strip free of roll marks.

8. The method of cold-rolling metal strip substantially free from roll marks caused by tail marks on the rolls, which comprises welding a plurality of pieces of metal strip end to end and then passing the composite strip thus formed through a cold-roll mill to reduce the thickness of the strip.

WILLIAM C. CORYELL.